United States Patent
Wang et al.

(10) Patent No.: US 11,643,498 B2
(45) Date of Patent: May 9, 2023

(54) THERMOPLASTIC SILICONE-POLYURETHANE ELASTOMER AND METHOD FOR PREPARING THE SAME

(71) Applicant: MIRACLL CHEMICALS CO., LTD., Shandong (CN)

(72) Inventors: Heilong Wang, Shandong (CN); Hongwei Song, Shandong (CN); Defu Liu, Shandong (CN); Sheng Zhang, Shandong (CN); Renhong Wang, Shandong (CN)

(73) Assignee: MIRACLL CHEMICALS CO., LTD., Shandong (CN)

( * ) Notice: Subject to any disclaimer, the term of this patent is extended or adjusted under 35 U.S.C. 154(b) by 799 days.

(21) Appl. No.: 16/483,670

(22) PCT Filed: Feb. 24, 2017

(86) PCT No.: PCT/CN2017/074660
§ 371 (c)(1),
(2) Date: Aug. 5, 2019

(87) PCT Pub. No.: WO2018/145333
PCT Pub. Date: Aug. 16, 2018

(65) Prior Publication Data
US 2020/0017626 A1    Jan. 16, 2020

(30) Foreign Application Priority Data
Feb. 10, 2017 (CN) .......................... 201710073545.9

(51) Int. Cl.
| | | |
|---|---|---|
| C08G 18/61 | (2006.01) | |
| B29B 9/06 | (2006.01) | |
| C08G 18/24 | (2006.01) | |
| C08G 18/32 | (2006.01) | |
| C08G 18/40 | (2006.01) | |
| C08G 18/42 | (2006.01) | |
| C08G 18/48 | (2006.01) | |
| C08G 18/66 | (2006.01) | |
| C08G 18/75 | (2006.01) | |
| C08G 18/76 | (2006.01) | |
| B29K 75/00 | (2006.01) | |
| B29K 83/00 | (2006.01) | |

(52) U.S. Cl.
CPC .............. *C08G 18/61* (2013.01); *B29B 9/065* (2013.01); *C08G 18/242* (2013.01); *C08G 18/3206* (2013.01); *C08G 18/3212* (2013.01); *C08G 18/4009* (2013.01); *C08G 18/4238* (2013.01); *C08G 18/4833* (2013.01); *C08G 18/4854* (2013.01); *C08G 18/664* (2013.01); *C08G 18/6674* (2013.01); *C08G 18/758* (2013.01); *C08G 18/7621* (2013.01); *C08G 18/7671* (2013.01); *B29K 2075/00* (2013.01); *B29K 2083/00* (2013.01)

(58) Field of Classification Search
CPC ............ B29K 2075/00; B29K 2083/00; C08G 1/5096; C08G 18/4018; C08G 18/4202; C08G 18/4277; C08G 18/4692; C08G 18/4808; C08G 18/6511; B29C 48/92; B29C 2948/92704; B29B 9/06
USPC ............................................................ 264/143
See application file for complete search history.

(56) References Cited

U.S. PATENT DOCUMENTS

| | | |
|---|---|---|
| 4,623,347 A | 11/1986 | Kira |
| 2005/0261447 A1 | 11/2005 | Koshiro et al. |
| 2013/0288062 A1* | 10/2013 | Van Loon ................ B05D 5/12 524/859 |

FOREIGN PATENT DOCUMENTS

| | | |
|---|---|---|
| CN | 1697847 A | 11/2005 |
| CN | 101006093 A | 7/2007 |
| CN | 100348638 | 11/2007 |
| CN | 102093702 A | 6/2011 |
| CN | 102260367 A | 11/2011 |
| CN | 102559031 A | 7/2012 |

(Continued)

OTHER PUBLICATIONS

Chinese Office Action for Chinese Patent Application No. 201710073545.9, dated Jan. 2, 2019, 11 pages.
Chinese Office Action for Chinese Patent Application No. 201710073545.9, dated Jan. 15, 2020, 7 pages.
Extended European Search Report for European Patent Application No. 17895997.9, dated Oct. 28, 2020, 10 pages.
Maogui et al., "Production technology and application of new polyurethane resin coating", Feb. 28, 2001, pp. 189-199, ISBN: 7-5359-2460-3.

(Continued)

*Primary Examiner* — Hannah J Pak
(74) *Attorney, Agent, or Firm* — Lathrop GPM LLP; Brian C. Trinque; Madison B. Aufai

(57) ABSTRACT

The present invention relates to a thermoplastic silicone-polyurethane elastomer and a method for preparing the same. The elastomer is prepared from raw materials comprising: 25-80 parts of a macromolecular polyol, 0-60 parts of a silicone oil or a liquid silicone rubber, 10-50 parts of a diisocyanate, 3-20 parts of a small molecular diol as a chain extender, and 0.1-3 parts of an auxiliary agent. The macromolecular polyol is selected from a silicon-free polyol having a molecular weight of between 1,000 and 4,000 g/mol and a polyol modified by silicone through copolymerization or grafting. The small molecular diol is a small molecular diol comprising 10 or less carbon atoms. The thermoplastic silicone-polyurethane elastomer of the present invention has the following excellent performance parameters: a hardness of Shore A40-D80; a tensile strength ≥5 MPa; smooth hand feeling; resistance to dirt such as dust; resistance to liquid permeation; no irritation to skin; good encapsulation effect on PC, ABS, TPU and the like; and a 180° peel strength >25 N/25 mm.

6 Claims, No Drawings

(56) References Cited

FOREIGN PATENT DOCUMENTS

| CN | 102926208 A | 2/2013 |
|---|---|---|
| CN | 104004153 A | 8/2014 |
| CN | 105399917 A | 3/2016 |
| CN | 105669929 A | 6/2016 |
| CN | 106366286 A | 2/2017 |
| KR | 10-2007-092955 A | 9/2007 |
| WO | WO 2009/085929 A1 | 7/2009 |

OTHER PUBLICATIONS

Vaidya et al., "Synthesis and Surface Properties of Environmentally Responsive Segmented Polyurethanes", Journal of Colloid and Interface Science, May 1, 2002, vol. 249, Issue 1, pp. 235-245.
Weihu et al., "Synthesis of EPDMS-based Water-borne PU and the Surface Property Investigation", China Coatings, Water-Bourne resin and Application, Jun. 25, 2010, vol. 25, No. 6, pp. 40-44.
Zhu et al., "Influence of hydroxyl-terminated polydimethylsiloxane on high-strength biocompatible polycarbonate urethane films", Biomedical Materials, Dec. 9, 2016, vol. 12, No. 1., pp. 1-13.
First Examination Report dated May 11, 2020 in related Indian Application No. 201937036024 (5 pages).
International Search Report dated Sep. 27, 2017 in related PCT Application No. PCT/CN2017/074660 (3 pages).

\* cited by examiner

THERMOPLASTIC SILICONE-POLYURETHANE ELASTOMER AND METHOD FOR PREPARING THE SAME

RELATED APPLICATIONS

This application is a 35 U.S.C. § 371 filing of International Patent Application No. PCT/CN2017/074660, filed Feb. 24, 2017, which claims priority to Chinese Application No. 201710073545.9, filed Feb. 10, 2017, the entire disclosures of which are hereby incorporated herein by reference.

TECHNICAL FIELD

The present invention relates to a thermoplastic polyurethane elastomer, and in particular to a thermoplastic silicone-polyurethane elastomer and a method for preparing the same. The present invention belongs to the technical field of polymer materials.

BACKGROUND OF THE INVENTION

A thermoplastic polyurethane elastomer (hereinafter referred to as TPU) is a linear polymer material resulting from the polymerization of a macromolecular diol, a diisocyanate, and a small molecular diol or diamine. TPU is a block copolymer comprising soft segments formed from the macromolecular diol and hard segments formed from the reaction of the diisocyanate with the small molecular diol. The molecular structure of alternating soft and hard segments results in microphase regions and induces microscopic phase separation. Additionally, due to the presence of a large number of polar groups, intramolecular and intermolecular hydrogen bonds can be formed in TPU, thereby generating physical cross-linking points. Therefore, when deformed, no sliding occurs between polymer chains, and elasticity is exhibited. When heated, the polymer chains move upon the melting of the cross-linking points, and then the flow occurs. Due to the unique structural features, TPU has both the processing performance of plastics and the physical and mechanical properties of rubbers. TPU is soluble and meltable. It not only has excellent properties such as a board hardness range, high strength, wear resistance, oil resistance, and good low-temperature flexibility, but also can significantly change the performance and applications of the product by adjusting the raw materials and their ratios. It is widely used in the fields of health care, electronics, electrics, industry, sports, etc.

However, TPU has poor skin-friendliness and insufficient resistance to dirt and permeation. Although silicone rubber products are highly skin-friendly, light-stable, dirt-resistant and permeation-resistant, they have poor mechanical strength, especially tensile strength and tear strength.

Therefore, there is a need to provide a thermoplastic polyurethane elastomer having good skin-friendliness and mechanical strength, and in particular, to provide a thermoplastic silicone-polyurethane elastomer that has high tensile strength and tear strength, no sensitization, yellowing resistance, and good processability, and is reprocessable and reusable, while ensuring a relatively simple and efficient production process and facilitating the automatic production, and thus can be widely used in the fields of smart wearable devices, medicine, industrial encapsulation, leather, etc., which have higher requirements for the hand feeling and the dirt-resistant performance.

SUMMARY OF THE INVENTION

To overcome the deficiencies of the existing TPU materials in skin-friendliness, dirt-resistance and permeation resistance and the deficiencies of the silicone rubbers in mechanical strength, the present invention provides a thermoplastic silicone-polyurethane elastomer and a method for preparing the same.

The technical solution of the present invention for solving the above technical problem is as follows:

A thermoplastic silicone-polyurethane elastomer, wherein the elastomer is prepared from raw materials comprising:
- 25-80 parts of a macromolecular polyol;
- 0-60 parts of a silicone oil or a liquid silicone rubber;
- 10-50 parts of a diisocyanate;
- 3-20 parts of a small molecular diol as a chain extender; and
- 0.1-3 parts of an auxiliary agent;
- wherein the macromolecular polyol is selected from the group consisting of a silicon-free polyol having a molecular weight of between 1,000 and 4,000 g/mol and a polyol modified by silicone through copolymerization or grafting; and the small molecular diol is a diol comprising 10 or less carbon atoms.

In a further embodiment, the macromolecular polyol is selected from the group consisting of a polyether polyol, a polyester polyol, a polycaprolactone polyol, a polycarbonate polyol, a hydroxyl-terminated polyolefin polyol, any combination thereof, and any polymer thereof modified by silicone through copolymerization or grafting.

In a further embodiment, the silicone oil is a silicone oil comprising an alcoholic hydroxyl group, wherein the functional group number of the alcoholic hydroxyl group is 1-3.

In a further embodiment, the liquid silicone rubber is an industrialized room temperature vulcanized (VTR) silicone rubber having a curing time of more than 60 minutes.

In a further embodiment, the diisocyanate is selected from the group consisting of toluene diisocyanate, diphenylmethane diisocyanate, dicyclohexylmethane diisocyanate, hexamethylene diisocyanate and any combination thereof.

In a further embodiment, the small molecular diol is selected from the group consisting of ethylene glycol, 1,3-propanediol, 2-methyl-1,3-propanediol, 1,3-butanediol, 1,4-butanediol, 1,6-hexanediol, 1,4-cyclohexanedimethanol, diethylene glycol, triethylene glycol, neopentyl glycol, dipropylene glycol, hydroquinone-bis(β-hydroxyethyl) ether, and any combination thereof.

In a further embodiment, the auxiliary agent comprises one or more selected from an antioxidant, a light stabilizer, a lubricant, a catalyst, and an antistatic agent.

The beneficial effects of the present invention are as follows:

The thermoplastic silicone-polyurethane elastomer of the present invention has the following excellent performance parameters: a hardness of Shore A40-D80; a tensile strength ≥5 MPa; smooth hand feeling; resistance to dirt such as dust; resistance to liquid permeation; no irritation to skin; good encapsulation effect on PC, ABS, TPU and the like; and a 180° peel strength >25 N/25 mm.

The present invention further claims the use of the above thermoplastic silicone-polyurethane elastomer in one or more fields of wearable devices, medicine, industrial encapsulation, electronic injection molding, and leather.

The present invention further provides a method for preparing the above thermoplastic silicone-polyurethane elastomer, comprising the steps of:

1) adding a weighed auxiliary agent to a macromolecular polyol, and allowing the auxiliary agent to be completely dissolved by stirring;
2) adding the macromolecular polyol obtained from step 1), along with stoichiometric amounts of a small molecular polyol, a diisocyanate in liquid state, and a silicone oil in liquid state or a liquid silicone rubber, into a twin-screw extruder, and subjecting materials extruded therefrom to granulation by underwater cutting; and
3) drying the granulated product obtained from step 2), to obtain the elastomer.

In a further embodiment, in step 2), the twin-screw extruder is set at a temperature of 120-250° C., and the granulation is conducted at a water temperature of 5-70° C.; and in step 3), the drying is conducted at a drying temperature of 50-90° C. with a drying time of 0.5-4 h.

DETAILED DESCRIPTION OF THE INVENTION

The principles and features of the present invention are described below in connection with the examples, which are intended to illustrate the present invention only and are not intended to limit the scope of the present invention.

Example 1

A thermoplastic silicone-polyurethane elastomer was prepared from the following raw materials: 57 parts of a polytetrahydrofuran ether glycol (PTMG) having a molecular weight of 2,000 g/mol; 15 parts of a silicone oil terminated with PEG at both ends, having a hydroxyl value of 38 mg KOH/g; 23 parts of diphenylmethane diisocyanate (MDI); 15 parts of 1,4-butanediol, R=nNCO/nOH=1.01 in the total system; 0.6 part of an antioxidant, Irganox 1010; 0.5 part of Tinuvin 622 and 0.8 part of Tinuvin 328 as the light stabilizer; 0.3 part of a lubricant, EBO; and 0.2 part of silicone powder.

The above thermoplastic silicone-polyurethane elastomer was prepared as follows:

1) The weighed antioxidant, light stabilizer, and lubricant were added to the polytetrahydrofuran ether glycol (PTMG) which was then heated to 100° C. and stirred for 2 hours to completely dissolve the auxiliary agents.

2) The heated polytetrahydrofuran ether glycol (PTMG), 1,4-butanediol, diphenylmethane diisocyanate (MDI) at 45-50° C., and silicone oil at 60-120° C. were added into a twin-screw extruder in stoichiometric ratios. The temperature of the twin-screw extruder was controlled at 120-250° C. The polymer discharged from the die was subjected to granulation by underwater cutting to give elliptical pellets. The temperature of water was controlled at 20-30° C.

3) The pellets obtained from step 2) were dried at 50° C. for 2 hours and then packaged.

Example 2

A thermoplastic silicone-polyurethane elastomer was prepared from the following raw materials: 59 parts of a polytetrahydrofuran ether glycol (PTMG) having a molecular weight of 1,800 g/mol; 30 parts of a silicone oil terminated with PEG at both ends, having a hydroxyl value of 55 mg KOH/g; 32 parts of diphenylmethane diisocyanate (MDI); 20 parts of 1,4-butanediol, R=nNCO/nOH=1.01 in the total system; 0.2 part of Irganox 1010 and 0.3 part of Irganox 1076 as the antioxidant; 1.0 part of Tinuvin 770 and 0.5 part of Tinuvin P as the light stabilizer; 0.5 part of a lubricant, EBS; and 0.5 part of oleamide.

The above thermoplastic silicone-polyurethane elastomer was prepared as follows:

1) The weighed antioxidant, light stabilizer, and lubricant were added to the polytetrahydrofuran ether glycol (PTMG) which was then heated to 100° C. and stirred for 2 hours to completely dissolve the auxiliary agents.

2) The heated polytetrahydrofuran ether glycol (PTMG), 1,4-butanediol, diphenylmethane diisocyanate (MDI) at 45-50° C., and silicone oil at 60-120° C. were added into a twin-screw extruder in stoichiometric ratios. The temperature of the twin-screw extruder was controlled at 120-250° C. The polymer discharged from the die was subjected to granulation by underwater cutting to give round pellets. The temperature of water was controlled at 30-40° C.

3) The pellets obtained from step 2) were dried at 60° C. for 1.5 hours and then packaged.

Example 3

A thermoplastic silicone-polyurethane elastomer was prepared from the following raw materials: 45 parts of polyoxyethylene glycol (PEG) having a molecular weight of 2,500 g/mol; 30 parts of a silicone oil terminated with PEG at both ends, having a hydroxyl value of 40 mg KOH/g; 50 parts of toluene diisocyanate (TDI); 10 parts of 1,3-propanediol, R=nNCO/nOH=1.01 in the total system; 0.2 part of Irganox 1010, 0.2 part of Irganox 1076, and 0.2 part of Irganox 1098 as the antioxidant; 1.5 parts of Tinuvin 770 and 0.5 part of Tinuvin P as the light stabilizer; 0.6 part of a lubricant, erucamide; and 0.6 part of stearicamide.

The above thermoplastic silicone-polyurethane elastomer was prepared as follows:

1) The weighed antioxidant, light stabilizer, and lubricant were added to polyoxyethylene glycol (PEG) which was then heated to 100° C., and stirred for 2 hours to completely dissolve the auxiliary agents.

2) The heated polyoxyethylene glycol (PEG), 1,3-propanediol, toluene diisocyanate (TDI) at 45-50° C., and silicone oil at 60-120° C. were added into a twin-screw extruder in stoichiometric ratios. The temperature of the twin-screw extruder was controlled at 120-250° C. The polymer discharged from the die was subjected to granulation by underwater cutting to give round pellets. The temperature of water was controlled at 5-15° C.

3) The pellets obtained from step 2) were dried at 80° C. for 0.5 hour and then packaged.

Example 4

A thermoplastic silicone-polyurethane elastomer was prepared from the following raw materials: 35 parts of a polyester diol (resulting from polymerization of adipic acid, 1,4-butanediol, and ethylene glycol) having a molecular weight of 3,000 g/mol; 45 parts of a silicone oil terminated with a polyester diol (adipic acid+1,4-butanediol) having a molecular weight of 500 g/mol at both ends, having a hydroxyl value of 30 mg KOH/g; 40 parts of toluene diisocyanate (TDI); 8 parts of 1,6-hexanediol, R=nNCO/nOH=1.01 in the total system; 0.1 part of an antioxidant, Irganox 1010; 0.05 part of a light stabilizer, Tinuvin 770; 0.05 part of a lubricant, erucamide; and 0.1 part of a catalyst, dibutyltin dilaurate.

The above thermoplastic silicone-polyurethane elastomer was prepared as follows:

1) The weighed antioxidant, light stabilizer, lubricant and catalyst were added to the polyester diol which was then heated to 100° C., and stirred for 2 hours to completely dissolve the auxiliary agents.

2) The heated polyester diol, 1,6-hexanediol, toluene diisocyanate (TDI) at 45-50° C., and silicone oil at 60-120° C. were added into a twin-screw extruder in stoichiometric ratios. The temperature of the twin-screw extruder was controlled at 120-250° C. The polymer discharged from the die was subjected to granulation by underwater cutting to give round pellets. The temperature of water was controlled at 5-15° C.

3) The pellets obtained from step 2) were dried at 90° C. for 0.5 hour and then packaged.

Example 5

A thermoplastic silicone-polyurethane elastomer was prepared from the following raw materials: 25 parts of a polyester diol (resulting from polymerization of adipic acid, 1,4-butanediol, and 1,6-hexanediol) having a molecular weight of 3,500 g/mol; 15 parts of a silicone oil terminated with PEG at both ends, having a hydroxyl value of 40 mg KOH/g; 10 parts of dicyclohexylmethane diisocyanate ($H_{12}$MDI); 3 parts of ethylene glycol; 0.05 part of an antioxidant, Irganox 1010; 0.05 part of a light stabilizer, Tinuvin 770; 0.05 part of a lubricant, erucamide; 0.1 part of a catalyst, dibutyltin diacetate; and 0.05 part of an antistatic agent.

The above thermoplastic silicone-polyurethane elastomer was prepared as follows:

1) The weighed antioxidant, light stabilizer, lubricant, catalyst, and antistatic agent were added to the polyester diol which was then heated to 100° C., and stirred for 2 hours to completely dissolve the auxiliary agents.

2) The heated polyester diol, ethylene glycol, dicyclohexylmethane diisocyanate ($H_{12}$MDI) at 45-50° C., and silicone oil at 60-120° C. were added into a twin-screw extruder in stoichiometric ratios. The temperature of the twin-screw extruder was controlled at 120-250° C. The polymer discharged from the die was subjected to granulation by underwater cutting to give round pellets. The temperature of water was controlled at 15-25° C.

3) The pellets obtained from step 2) were dried at 50° C. for 4 hours and then packaged.

Example 6

A thermoplastic silicone-polyurethane elastomer was prepared from the following raw materials: 35 parts of a polycaprolactone diol having a molecular weight of 3,000 g/mol; 15 parts of a silicone oil terminated with PEG at both ends, having a hydroxyl value of 40 mg KOH/g; 15 parts of diphenylmethane diisocyanate (MDI); 6 parts of 1,4-butanediol; 0.05 part of an antioxidant, Irganox 1010; 0.05 part of a light stabilizer, Tinuvin 770; 0.05 part of a lubricant, erucamide; and 0.05 part of a catalyst, dibutyltin diacetate.

The above thermoplastic silicone-polyurethane elastomer was prepared as follows:

1) The weighed lubricant and catalyst were added to the polycaprolactone diol which was then heated to 100° C., and stirred for 2 hours to completely dissolve the auxiliary agents.

2) The heated polycaprolactone diol, 1,4-butanediol, diphenylmethane diisocyanate (MDI) at 45-50° C., and silicone oil at 60-120° C. were added into a twin-screw extruder in stoichiometric ratios. The temperature of the twin-screw extruder was controlled at 120-250° C. The polymer discharged from the die was subjected to granulation by underwater cutting to give round pellets. The temperature of water was controlled at 15-25° C.

3) The pellets obtained from step 2) were dried at 50° C. for 4 hours and then packaged.

Example 7

A thermoplastic silicone-polyurethane elastomer was prepared from the following raw materials: 80 parts of a polyester polyol modified by silicone through copolymerization (adipic acid+1,4-butanediol+1,6-hexanediol+silicone) having a molecular weight of 3,000 g/mol, wherein the content of silicone is 10%; 20 parts of diphenylmethane diisocyanate (MDI); 10 parts of 1,4-butanediol, R=nNCO/nOH=1.01 in the total system; 0.05 part of an antioxidant, Irganox 1010; and 0.05 part of a catalyst, dibutyltin diacetate.

The above thermoplastic silicone-polyurethane elastomer was prepared as follows:

1) The weighed antioxidant and catalyst were added to the silicone-modified polyester polyol which was then heated to 100° C., and stirred for 2 hours to completely dissolve the auxiliary agents.

2) The heated silicone-modified polyester polyol, 1,4-butanediol, and diphenylmethane diisocyanate (MDI) at 45-50° C. were added into a twin-screw extruder in stoichiometric ratios. The temperature of the twin-screw extruder was controlled at 120-250° C. The polymer discharged from the die was subjected to granulation by underwater cutting to give round pellets. The temperature of water was controlled at 15-25° C.

3) The pellets obtained from step 2) were dried at 50° C. for 4 hours and then packaged.

Example 8

A thermoplastic silicone-polyurethane elastomer was prepared from the following raw materials: 80 parts of a polyester polyol modified by silicone through grafting (adipic acid+1,4-butanediol+ethylene glycol+silicone) having a molecular weight of 4,000 g/mol, wherein the content of silicone is 20%; 16 parts of diphenylmethane diisocyanate (MDI); 20 parts of 1,4-cyclohexanedimethanol, R=nNCO/nOH=1.01 in the total system; 0.05 part of an antioxidant, Irganox 1010; 0.05 part of a light stabilizer, Tinuvin 770; 0.05 part of a lubricant, erucamide; and 0.05 part of a catalyst, dibutyltin diacetate.

The above thermoplastic silicone-polyurethane elastomer was prepared as follows:

1) The weighed antioxidant, light stabilizer, lubricant, and catalyst were added to the silicone-modified polyester polyol which was then heated to 100° C., and stirred for 2 hours to completely dissolve the auxiliary agents.

2) The heated silicone-modified polyester polyol, 1,4-cyclohexanedimethanol, and diphenylmethane diisocyanate (MDI) at 45-50° C. were added into a twin-screw extruder in stoichiometric ratios. The temperature of the twin-screw extruder was controlled at 120-250° C. The polymer discharged from the die was subjected to granulation by underwater cutting to give round pellets. The temperature of water was controlled at 15-25° C.

3) The pellets obtained from step 2) were dried at 50° C. for 4 hours and then packaged.

Comparative Example 1

The raw materials include: 57 parts of a polytetrahydrofuran ether glycol (PTMG) having a molecular weight of 2,000 g/mol; 23 parts of diphenylmethane diisocyanate (MDI); 23 parts of 1,4-butanediol, R=nNCO/nOH=1.01 in the total system; 0.6 part of an antioxidant, Irganox 1010; 0.5 part of Tinuvin 622 and 0.8 part of Tinuvin 328 as the light stabilizer; 0.3 part of a lubricant, EBO; and 0.2 part of silicone powder.

Comparative Example 2

The raw materials include: 35 parts of a polyester diol (resulting from polymerization of adipic acid, 1,4-butanediol, and ethylene glycol) having a molecular weight of 3,000 g/mol; 40 parts of toluene diisocyanate (TDI); 8 parts of 1,6-hexanediol, R=nNCO/nOH=1.01 in the total system; 0.1 part of an antioxidant, Irganox 1010; 0.05 part of a light stabilizer, Tinuvin 770; 0.05 part of a lubricant, erucamide; and 0.1 part of a catalyst, dibutyltin dilaurate.

In order to verify the properties of the thermoplastic silicone-polyurethane elastomer obtained according to the present invention, performance tests were conducted on the sampels of Examples 1-8 and Comparative Examples 1-2, wherein:
- the hardness was tested in accordance with the ASTM D2240 standard;
- the tear strength was tested in accordance with the ASTM D624 standard;
- the yellowing resistance was tested according to ASTM D1148 for 48 hours, and judged by comparison with a gray scale;
- the sensitization test was conducted in accordance with the ISO10993 standard;
- the tensile strength was tested in accordance with the ASTM D412 standard; and
- the hand feeling smoothness was tested in accordance with the in-house standard. Specifically, the test was performed using a grinding tool made by our company, which comprised three test piece die cavities for polishing samples with different meshes, and one planar test piece die cavity. 5 levels of standard samples were prepared using the same grinding tool. The test pieces were touched by the observers separately, and compared with the standard samples. When all of the 4 test pieces were closest to a certain level of standard sample, the test pieces were determined to have this level.

The evaluation criteria were as follows: the hand feeling smoothness was divided into five levels: 1, 2, 3, 4, and 5, with 1 being the worst and 5 being the best.
- Level 1: unsmooth hand feeling, with the test pieces completely adhered to the die cavity;
- Level 2: unsmooth hand feeling, with ⅔ of the test pieces adhered to the die cavity;
- Level 3: general hand feeling, with less than ½ of the test pieces adhered to the die cavity;
- Level 4: smooth hand feeling, with the test pieces not adhered to the die cavity; and
- Level 5: smooth hand feeling, with the test pieces naturally falling off when the mold is opened.

The permeation resistance test was performed according to the enterprise's standard. The test pieces were smeared with a marker pen, a gel pen, a ballpoint pen, ink, or the like on the surface, or immersed in juice, tea, or the like. They were set aside for 96 h, and then removed for observation of permeation and trace cleaning.

The evaluation criteria were as follows: the permeation resistance was divided into three levels: 1, 2, and 3, with 1 being the worst and 3 being the best.
- Level 1: the trace is completely penetrated, and upon wiping, the trace is kept unchanged and remains completely;
- Level 2: the trace is partly penetrated, and upon wiping, the trace is reduced but cannot be completely wiped off; and
- Level 3: no trace is penetrated, and upon wiping, the trace is removed and there is no residual trace.

The results are shown in Table 1.

TABLE 1

Main physical and chemical properties of the products obtained in Examples 1-8 and Comparative Examples 1-2

| Performance index | Hardness Shore A | Tear strength kN/m | Tensile strength MPa | Hand feeling smoothness / | Yellowing resistance Level | Sensitization — | Permeation resistance (Marker pen) Level |
|---|---|---|---|---|---|---|---|
| Example 1 | 73 | 60 | 13 | 3 | 4.5 | non-toxic | 2 |
| Example 2 | 63 | 42 | 10 | 4 | 4.5 | non-toxic | 2 |
| Example 3 | 82 | 70 | 20 | 4 | 4.5 | non-toxic | 2 |
| Example 4 | 78 | 55 | 24 | 4 | 4.5 | non-toxic | 3 |
| Example 5 | 76 | 60 | 18 | 3 | 5 | non-toxic | 2 |
| Example 6 | 69 | 65 | 15 | 4 | 4.5 | non-toxic | 3 |
| Example 7 | 71 | 52 | 18 | 5 | 4.5 | non-toxic | 3 |
| Example 8 | 65 | 48 | 14 | 5 | 4.5 | non-toxic | 3 |
| Comparative Example 1 | 73 | 55 | 22 | 1 | 4.5 | non-toxic | 1 |
| Comparative Example 2 | 72 | 70 | 25 | 1 | 4.5 | non-toxic | 1 |

The data in Table 1 show that the thermoplastic silicone-polyurethane elastomers provided by the present invention are improved by several levels in terms of hand feeling and skin-friendliness as compared to the conventional TPU. Therefore, the silicone-containing TPU of the present invention can be used in the fields of wearable devices, medicine, industrial encapsulation, electronic injection molding, leather, and the like which have a relatively high requirements for hand feeling and dirt-resistance.

The above are only preferred embodiments of the present invention, and are not intended to limit the present invention. Any modifications, equivalents, improvements, and so on, which fall within the spirit and scope of the present invention, should be included in the protection scope of the present invention.

What is claimed is:

1. A thermoplastic silicone-polyurethane elastomer, characterized in that the elastomer is prepared from raw materials comprising:
    25-80 parts of a macromolecular polyol;
    15-45 parts of a silicone oil;
    10-50 parts of a diisocyanate;
    3-20 parts of a small molecular diol as a chain extender; and
    0.1-3 parts of an auxiliary agent;
    wherein the macromolecular polyol is selected from the group consisting of a silicon-free polyol having a molecular weight of between 1,000 and 4,000 g/mol and a polyol modified by silicone through copolymerization or grafting; and the small molecular diol is a diol comprising 10 or less carbon atoms.

2. The thermoplastic silicone-polyurethane elastomer according to claim 1, wherein the macromolecular polyol is selected from the group consisting of a polyether polyol, a polyester polyol, a polycaprolactone polyol, a polycarbonate polyol, a hydroxyl-terminated polyolefin polyol, any combination thereof, and any polymer thereof modified by silicone through copolymerization or grafting.

3. The thermoplastic silicone-polyurethane elastomer according to claim 1, wherein the silicone oil is a silicone oil comprising an alcoholic hydroxyl group which has a functional group number of 1-3.

4. The thermoplastic silicone-polyurethane elastomer according to claim 1, wherein the diisocyanate is selected from the group consisting of toluene diisocyanate, diphenylmethane diisocyanate, dicyclohexylmethane diisocyanate, hexamethylene diisocyanate, and any combination thereof.

5. The thermoplastic silicone-polyurethane elastomer according to claim 1, wherein the small molecular diol is selected from the group consisting of ethylene glycol, 1,3-propanediol, 2-methyl-1,3-propanediol, 1,3-butanediol, 1,4-butanediol, 1,6-hexanediol, 1,4-cyclohexanedimethanol, diethylene glycol, triethylene glycol, neopentyl glycol, dipropylene glycol, hydroquinone-bis(β-hydroxyethyl) ether, and any combination thereof.

6. The thermoplastic silicone-polyurethane elastomer according to claim 1, wherein the auxiliary agent comprises one or more selected from an antioxidant, a light stabilizer, a lubricant, a catalyst, and an antistatic agent.

* * * * *